Jan. 29, 1935.  R. E. THOMPSON  1,989,119
IMPACT TOOL
Filed Dec. 8, 1931
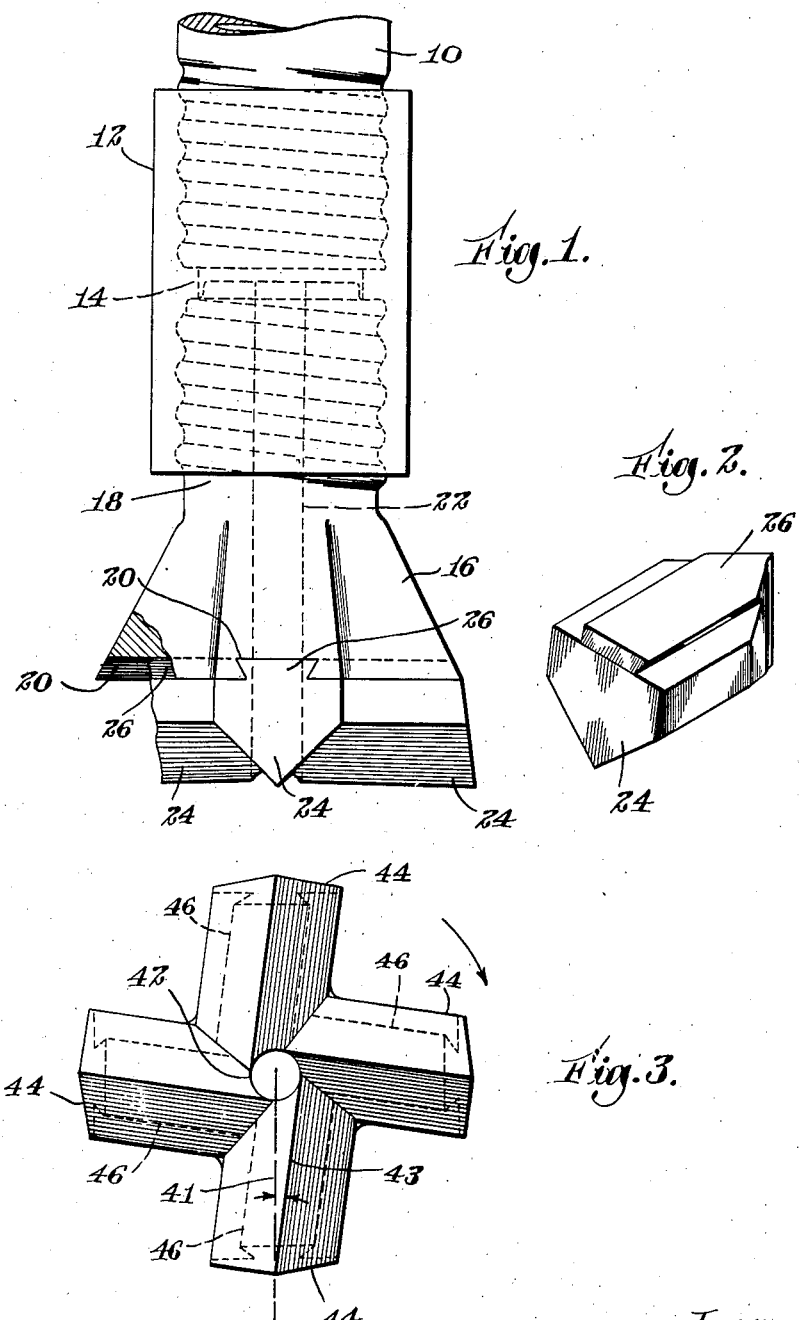
Inventor
Ralph E. Thompson
by Kenway + Witter
Attorneys Patented Jan. 29, 1935

1,989,119

UNITED STATES PATENT OFFICE 1,989,119

IMPACT TOOL

Ralph E. Thompson, Brookline, Mass.

Application December 8, 1931, Serial No. 579,687

4 Claims. (Cl. 255—64)

This invention relates to improvements in impact tools and in this term I include rock drills, pavement breaking tools and cutters in general which are operated by impact to perform their intended function. In one aspect my invention comprises an improved tool of this kind in which the cutting element or elements comprise separate cutting teeth of high-grade material detachably mounted in the head of the tool.

The duty to which rock drills are subjected is extremely destructive and as improvements have been made in drilling machinery the efficiency of the drilling operation has depended more and more upon the high quality of the cutting elements of the drill. This has brought about the use of high-grade tungsten steel which is extremely expensive and difficult to machine. On this account, it has been the practice to provide the tool with a detachable head of tungsten steel or similar high-grade alloy while using a less expensive steel in the rod or shank of the tool. This has proved satisfactory to a certain degree but the cutting heads heretofore used have been in themselves expensive mechanical parts and in a cutter having a plurality of teeth damage to a single tooth has destroyed the efficiency of the whole cutting tool.

With the conditions above discussed in mind I have designed a cutter head provided with suitable recesses for the reception of one or more separate teeth which may be made of high-grade material and detachably mounted in each recess. In such a construction the body of the cutting head itself may be made of tool steel or other relatively inexpensive and conveniently worked material, whereas the separate teeth may be constructed of the highest grade tungsten steel or of a nitrided ferrous alloy of extreme hardness. Such teeth may be assembled in the cutter head and replaced singly in case of damage. In this way I am able to effect considerable economy in the manufacture of the tool itself, to improve the hardness of the actual cutting edges thereof and to improve greatly the convenience to the user, who need carry with him only an assortment of detachable teeth in order to keep his drill in the highest state of efficiency.

An important field of use of my invention is in connection with rock drills of the rose type, which comprise four cutting edges disposed substantially radially and at right angles to the axis of the drill. In embodying my invention in such a drill, the drill head may be provided with four dove-tailed grooves and the detachable teeth may be similarly shaped so that they may be readily inserted into or removed from the grooves of the head.

In rock drilling it is the practice to rotate the drill between drilling strokes and with this condition in mind another feature of my invention consists in arranging the tooth-receiving recesses to extend at a slight angle to a radius of the cutter head such that the normal rotary movement of the drill tends to seat the separate teeth in the head, tending to move them inwardly. This feature is important in that it prevents accidental displacement of the teeth, obviates the necessity for separate fastening means and leaves them free to be detached whenever this is desired by the operator.

These and other features of the invention will be best understood and appreciated from the following description of a preferred embodiment thereof, selected for purposes of illustration and shown in the accompanying drawing, in which Fig. 1 is a view in elevation of a rock drill embodying my invention, one corner being broken away;

Fig. 2 is a view in perspective of one of the detachable teeth; and

Fig. 3 is a bottom plan view of a drill of slightly modified form.

The lower end of the drill rod 10 is shown as provided with a left-hand thread to receive a correspondingly threaded coupling sleeve 12 having an internal shoulder 14 against which the end of the drill rod abuts when the drill is assembled for use. The cutting head 16 is provided with a shank 18 similarly threaded to enter the lower end of the coupling and to abut at its upper end against the lower face of the shoulder 14. At its lower end the cutting head 16 flares outwardly in four distinct sections. These sections are faced in a horizontal plane disposed at right angles to the axis of the tool, thus forming the pressure-receiving face of the head, and each is provided with a dove-tailed groove 20 which extends radially with respect to the axis of the tool. The drill rod and the cutting head 16 are both provided with a central longitudinal passage 22 by which compressed air is led to the cutting point and the chips blown up between the sections of the head.

Four separate cutting teeth are provided for insertion in the recesses 20. Each tooth 24 is provided with a wide undercut rib 26 projecting from its upper or pressure receiving surface and arranged to fit in the undercut passage of a recess 20. The upper surface of the rib 26 is flat and makes a wide flat bearing with the opposite face of the cutting head, and the same is true of the flat portions of the upper face of the tooth at either side of the rib 26. The side walls of the body of the tooth are parallel and disposed substantially at right angles to its pressure-receiving face and these merge into symmetrically-disposed inclined edge-forming faces. The tooth 24, as already explained, may be of the highest-grade tungsten steel or of such a nitridable ferrous alloy as nitralloy. The tooth may be hardened throughout or its greatest hardness may be limited to the apex of its lower cutting edge, but in any case I have facilitated the use of the best-suited metal for drilling purposes in the actual cutting edge of the drill regardless of its expense or attendant difficulty in machining. Preferably, the fit of the undercut rib 26 in the dove-tailed recess of the cutting head is a driving fit so that the teeth may be assembled by simply driving them into place.

The axes of the teeth shown in the tool of Fig. 1 are arranged substantially radially with respect to the axis of the drill rod and such a tool will be found entirely satisfactory under many conditions. In order to impart to the individual teeth a tendency to work inwardly and so eliminate the possibility of outward displacement, I have illustrated in Fig. 3 a cutting head of the same general style but having the axis of its teeth arranged obliquely with respect to radial lines in the head. In this construction the axis of each recess for the teeth is inclined about 4° from a radial line to the tip of the tooth and the tooth 44 is correspondingly shaped. As shown in Fig. 3, 41 indicates a radial line from the center of the axis of the cutting head to the tip of the tooth 44 and the line 43, which indicates the vertex of the edge of the tooth, corresponds to the longitudinal axis of the tooth. It will be seen that the axis of the tooth is inclined rearwardly with respect to the radius with reference to the direction of rotation of the drill, which is indicated to be clockwise, as seen in Fig. 3. The central air passage or bore 42 is shown in this figure of the drawing and it will be apparent that the axial line of each tooth is substantially tangent to the circumference of this bore. Each of the teeth 44 is provided on its upper surface with an undercut rib 46 and the inner ends of the teeth are shaped at an angle of substantially 45° to fit against each other and are cut away so as to form the walls of the air passage 42. It will be apparent that with teeth designed and positioned as shown, the rotation of the cutter head will tend to urge each individual tooth inwardly so that the assembly is held at all times in tight and compact condition.

I have herein illustrated my invention as embodied in a drill having a separate shank and head but it will be understood that it would be within the scope of the invention to form the cutter head as an integral part of the drill rod.

Having thus described my invention, what I claim as new and desire to secure by Letters Patent is:

1. In an impact tool, a solid cutting head having radially-disposed sections terminating in a common plane at right angles to the axis of the head, a plurality of dove-tailed ways in the head disposed at an inclination to radial lines in the head rearwardly and inwardly with reference to the direction of rotation of the head, and a plurality of cutting teeth of high-grade material detachably received in said ways and angularly shaped to fit together at their inner ends.

2. In an impact tool, a cutting head having a flat end face with a plurality of outwardly-directed shallow dove-tailed grooves therein, the longitudinal axis of each groove being disposed tangent to a circle concentric to the axis of the tool, and cutting teeth of high-grade material, each tooth having a body portion with a flat pressure-receiving face and a dove-tailed rib thereon adapted to fit within one of said grooves and hold the pressure-receiving face of the tooth against the corresponding face of the head, parallel side walls disposed substantially at right angles to its pressure-receiving face, and inclined edge-forming faces.

3. In an impact tool, a solid cutting head having an end face with a plurality of grooves therein, the center line of each groove extending inwardly at an angle to a radial line drawn from the point in which said center line intersects the periphery of the drill, and a detachable cutting tooth of high grade material mounted in each of said grooves and located in the tool by an abutment at its inner end.

4. In an impact tool, a solid cutting head having an end face with outwardly extending grooves therein each of which is disposed with its center line at an angle to a radial line drawn from the point where the center line intersects the periphery of the drill, and a detachable cutting tooth of high grade steel mounted in each of said grooves and having a cutting edge which extends at an angle to a radial line passing through its outer end, the cutting teeth being assembled in the tool in abutting relation at their inner ends.

RALPH E. THOMPSON.